US007130739B2

(12) United States Patent
Ito et al.

(10) Patent No.: US 7,130,739 B2
(45) Date of Patent: Oct. 31, 2006

(54) CONTROL SYSTEM AND METHOD FOR MARINE ENGINE

(75) Inventors: Kazumasa Ito, Hamamatsu (JP); Syu Akuzawa, Hamamatsu (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/858,561

(22) Filed: Jun. 1, 2004

(65) Prior Publication Data

US 2005/0192735 A1 Sep. 1, 2005

(30) Foreign Application Priority Data

Mar. 1, 2004 (JP) ............................. 2004-055888

(51) Int. Cl.
*B63H 21/21* (2006.01)
*F02D 45/00* (2006.01)
(52) U.S. Cl. ........................................ 701/115; 701/101
(58) Field of Classification Search ................ 701/115, 701/101, 104, 25, 33; 340/426.16, 426.17, 340/441, 853.9
See application file for complete search history.

(56) References Cited

U.S. PATENT DOCUMENTS 5,714,948 A * 2/1998 Farmakis et al. ............. 340/961
5,917,405 A * 6/1999 Joao ....................... 340/426.17
6,553,290 B1 * 4/2003 Pillar .......................... 701/33

FOREIGN PATENT DOCUMENTS

| JP | 2003-34235 | 2/2003 |
| JP | 2003-327055 | 11/2003 |
| JP | 2004-42898 | 2/2004 |

* cited by examiner

*Primary Examiner*—Tony M. Argenbright
*Assistant Examiner*—Johnny H. Hoang
(74) *Attorney, Agent, or Firm*—Knobbe, Martens, Olson & Bear, LLP

(57) ABSTRACT

A control system for a marine engine includes a control device to control the engine. A transmitter creates a command signal and sends the command signal to a receiver. The receiver receives the command signal and transfers the command signal to the control device. The control device includes memory to store the command signal. The control device determines whether the command signal is correctly transferred to the control device. The control device controls the engine in complying with the command signal transferred from the receiver when the command signal is correctly transferred. The control device controls the engine in complying with the command signal stored in the storage device when the command signal is not correctly transferred.

21 Claims, 4 Drawing Sheets

CONTROL SYSTEM AND METHOD FOR MARINE ENGINE

PRIORITY INFORMATION

This application is based on and claims priority under 35 U.S.C. § 119 to Japanese Patent Application No. 2004-055888, filed Mar. 1, 2004, the entire contents of which being hereby expressly incorporated by reference herein.

BACKGROUND OF THE INVENTION

1. Field of the Invention

The present invention generally relates to a control system and a method for controlling a marine engine, and more particularly relates to an improved control system and method that controls a marine engine using a command unit that includes a transmitter and a receiver.

2. Description of Related Art

Automobiles in recent years have been provided with an automatic control system using a transmitter that can remotely communicate with a receiver on the automobile to allow an engine of the automobile to start. Typically, an ID code is applied to identify whether a transmitter is the true key that is accessible to an associated receiver. Unless the system determines that the ID code is true, the person who has tried to use the key is not allowed to start the engine.

The control system also can allow the driver of the automobile to lock or unlock door locks, a transmission lock, a steering lock of the automobile or to use devices such as, for example, a navigation device through the transmitter. If the transmitter and/or the receiver do not work properly, the driver can use an auxiliary device that allows the driver to operate the foregoing locks and/or the devices by inputting a password. Japanese patent publications Nos. 2004-42898 and 2003-327055 disclose examples of such automobile systems.

Small watercraft, like automobiles, also employ an engine to power the vehicle. For example, in a personal watercraft (PWC), a hull of the watercraft typically defines a rider's area above an engine compartment. An internal combustion engine powers a jet propulsion unit that propels the watercraft by discharging water rearward. The engine lies within the engine compartment in front of a tunnel, which is formed on an underside of the hull. At least part of the jet propulsion unit is placed within the tunnel and includes an impeller that is driven by the engine.

SUMMARY OF THE INVENTION

An aspect of the present invention involves the recognition that watercraft (e.g., personal watercraft) can be provided with similar engine control devices and systems to those applied to automobiles. The devices and systems, however, cannot be incorporated in the watercraft without modification in order to ensure that the engine can operate even when a communication error within the system occurs. A need therefore exists for a control system and method for a watercraft that can properly control the engine under any conditions, even when a transmitter and a receiver or internal modules of the control system fail to communicate properly with one another.

One aspect of the present invention involves a control system for a marine engine that comprises a control device configured to control the engine. A command unit is configured to provide a command signal to the control device. The command unit comprises a transmitter and a receiver. The transmitter is configured to generate the command signal and to send the command signal to the receiver. The receiver is configured to receive the command signal and to transmit (either directly or indirectly) the command signal to the control device. The control device comprises memory that stores the command signal. The control device determines whether the command signal is correctly transferred to the control device. The control device controls the engine in complying with the command signal transferred from the receiver when the command signal is correctly transferred. The control device controls the engine in complying with the command signal stored in memory when the command signal is not correctly transferred.

Another aspect of the present invention involves a control system for a marine engine that comprises a control device for controlling the engine. A command unit is configured to provide a command signal to the control device. The command unit comprises a transmitter and a receiver. The transmitter is configured to create the command signal and to send the command signal to the receiver. The receiver is configured to receive the command signal and to transfer the command signal to the control device. The control device comprises a storage device configured to store the command signal. The control device determines whether the command signal is correctly read out from the storage device. The control device controls the engine in complying with the command signal stored in the storage device when the command signal is correctly read out from the storage device. The control device controls the engine in complying with a predetermined command signal when the command signal is not correctly read out from the storage device.

A further aspect of the present invention involves a control method for controlling a marine engine. The method comprises creating a command signal, transferring the command signal to a control device, storing the command signal in a storage device, determining whether the command signal is correctly transferred to the control device, controlling the engine in complying with the command signal transferred to the control device when the command signal is correctly transferred, and controlling the engine in complying with the command signal previously stored in the storage device when the command signal is not correctly transferred.

An additional aspect of the present invention involves a control method for controlling a marine engine. The method comprises creating a command signal, transferring the command signal to a control device, storing the command signal in a storage device, reading out the command signal from the storage device, determining whether the command signal is correctly read out, controlling the engine in complying with the command signal stored in the storage device when the command signal is correctly read out from the storage device, and controlling the engine in complying with a predetermined command signal when the command signal is not correctly read out from the storage device.

BRIEF DESCRIPTION OF THE DRAWINGS

These and other features, aspects and advantages of the present invention are now described in detail below with reference to the drawings of a preferred embodiment that is intended to illustrate and not to limit the invention. The drawings comprise four figures in which.

DETAILED DESCRIPTION OF THE PREFERRED EMBODIMENT OF THE INVENTION

Figure 1:
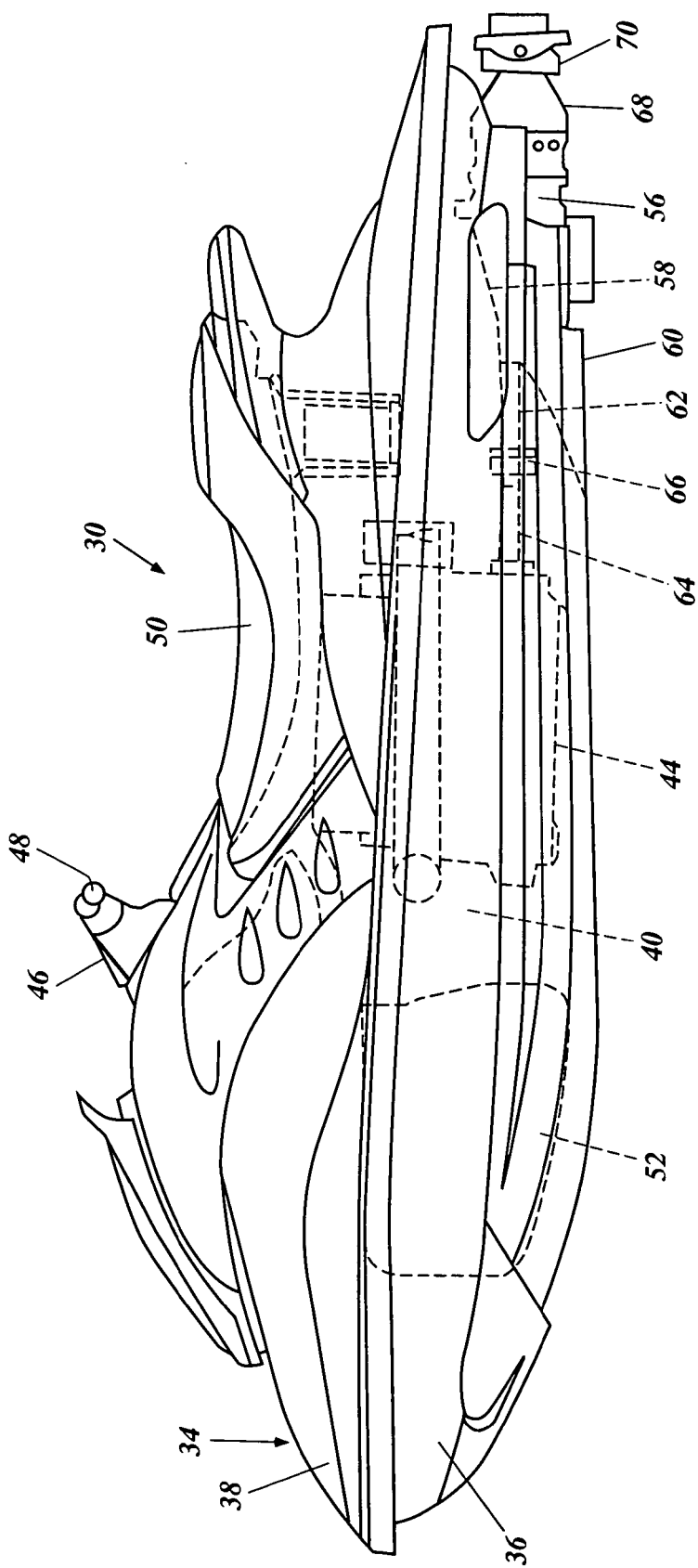
FIG. 1 illustrates a side elevational view of a personal watercraft incorporating a control system configured in accordance with a preferred embodiment of the present invention.

With reference to FIG. 1, an overall construction of a personal watercraft 30 that incorporates a control system 32 (FIG. 2), which is configured in accordance with a preferred embodiment of the present invention is described below. The control system is described in the context of a personal watercraft. The described control system, however, can be readily adapted for use with other types of watercraft and propulsion systems such as, for example, but without limitation, jet boats and small boats (e.g., run-abouts, sport boats, ski boats, cruisers, pontoons, and fishing boats) that include either inboard drives, stem drives or outboard motors.

The personal watercraft 30 includes a hull 34 generally formed with a lower hull section 36 and an upper hull section or deck 38. Both the hull sections 36, 38 are made of, for example, a molded fiberglass reinforced resin or a sheet-molding compound. The lower hull section 36 and the upper hull section 38 are coupled together to define an internal cavity 40. The hull 36 houses an internal combustion engine 44 that powers the watercraft 30. The engine 44 in the illustrated embodiment is a multiple cylinder engine.

In the illustrated embodiment, a bow portion of the upper hull section 38 slopes upwardly. A steering mast 46 extends generally upwardly toward the top of the bow portion to support a handle bar 48. The handle bar 48 is provided primarily to allow a rider to change a thrust direction of the watercraft 30. The handle bar 48 carries control devices such as, for example, a throttle lever for controlling operation of the engine 44. Also, the handle bar 48 preferably has an engine start switch and an engine stop switch. In one variation, one button or switch can be used to both start and stop the engine, as is well known in the personal watercraft art. In the illustrated embodiment, the rider can start the engine 44 by operating the engine start switch under certain conditions that the control system 32 regulates. Also, the rider can stop the engine 44 by operating the stop switch. Preferably, a lanyard couples the rider to the stop switch and/or to a circuit that will stop the engine if the lanyard is removed from its base on the watercraft, as is well known in the art. The stop switch and the lanyard thus preferably can stop the engine.

A seat 50 extends fore to aft along the hull 34 behind the steering mast 46. The seat 50 is configured generally with a saddle shape so that the rider can straddle the seat 50. The seat 50 comprises a seat pedestal that preferably is unitarily formed with the upper hull section 38 and a seat cushion that is detachably placed on the seat pedestal. Foot areas preferably are defined on both sides of the seat 50 and on an upper surface of the upper hull section 38.

An access opening is defined in an upper surface of the seat pedestal so that a rider can conveniently access the internal cavity 40. The access opening is correctly closed by the seat cushion. The internal cavity 40 in part defines an engine compartment generally under the seat 50. The engine 44 is placed within the engine compartment. The rider preferably can access the engine 44 through the access opening by detaching the seat cushion from the seat pedestal.

A fuel tank 52 preferably is placed in the internal cavity 40 under the bow portion of the upper hull section 38 and in front of the engine compartment. One or more air ducts are provided to allow ambient air to enter the engine compartment. Except for the air ducts, the internal cavity is substantially sealed to protect the engine 44, a fuel supply system (including the fuel tank 52) and other systems or components from water.

A jet pump assembly 56 preferably propels the watercraft 30. A housing of the jet pump assembly 56 is mounted in a tunnel 58 formed on the underside of the lower hull section 36. The tunnel 58 has an inlet port 60 opening toward the body of water. The jet pump assembly 56 includes an impeller journaled within a housing of the assembly 56. An impeller shaft 62 extends forwardly from the impeller and an output shaft 64 extends rearward from the engine 44. A coupling member 66 couples the impeller shaft 62 and the output shaft 64 with each other. The output shaft 64 is connected to a crankshaft of the engine 44 through a coupling mechanism such as, for example, a gear combination including a reduction gear or a direct drive connection. In some applications, however the engine crankshaft can directly connect to the coupling member 66.

A rear end of the housing of the jet pump assembly 56 preferably defines a discharge nozzle 68. A deflector or steering nozzle 70 is affixed to the discharge nozzle 68 for pivotal movement about a steering axis, which extends generally vertically. A cable preferably connects the deflector 70 with the steering mast 46 so that the rider can steer the deflector 70, and thereby change the direction of travel of the watercraft 30.

In operation, the engine 44 drives the impeller shaft 62 and thus water is drawn into the housing of the pump assembly 56 through the inlet port 60. The pressure generated in the housing by the impeller produces a jet of water that is discharged through the discharge nozzle 68 and the deflector 70. The water jet thus produces thrust to propel the watercraft 30. The rider can steer the deflector 70 with the handle bar 48 of the steering mast 46 to turn the watercraft 30 in either right or left direction.

Figure 2:
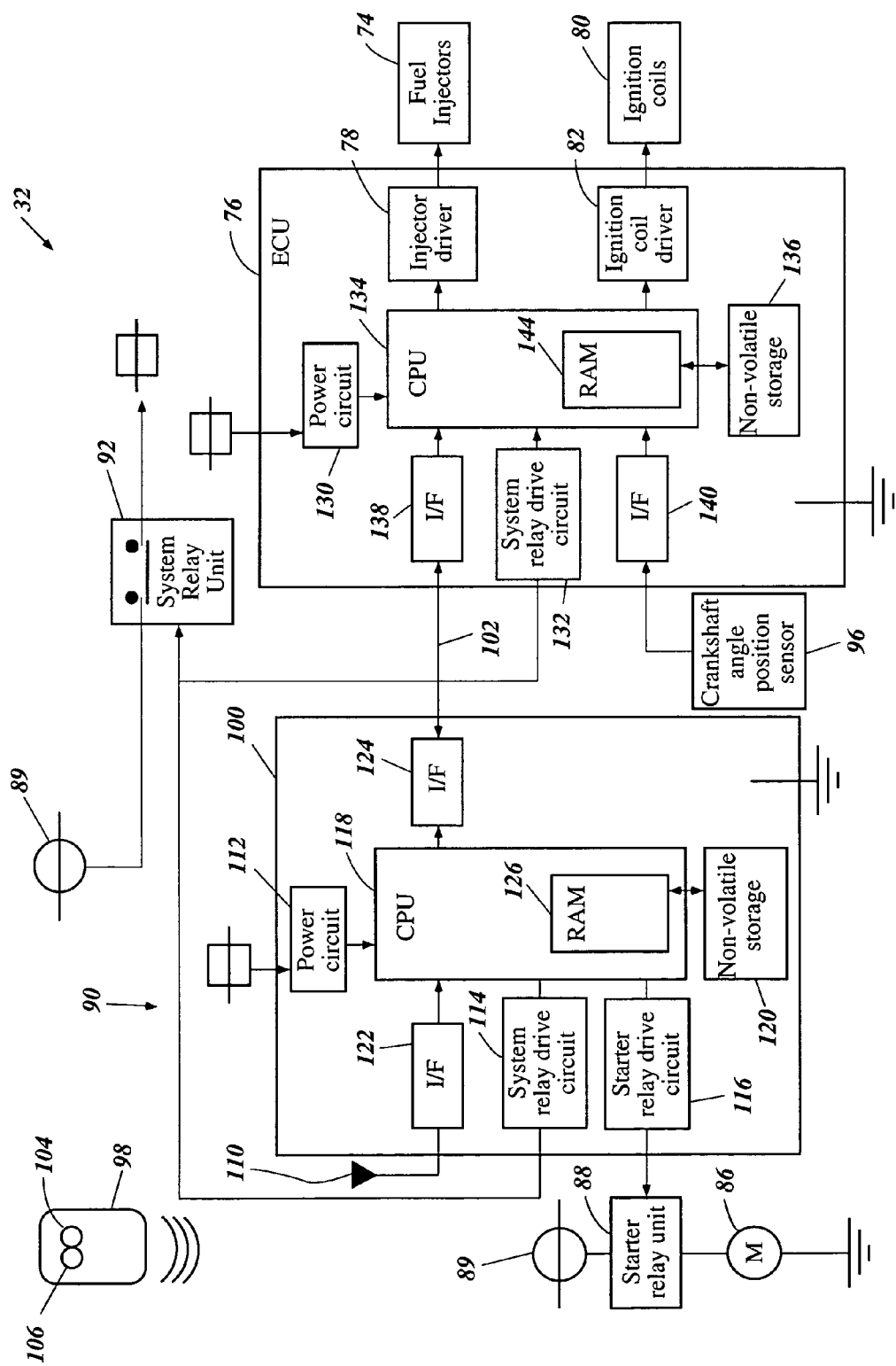
FIG. 2 illustrates a block diagram of an embodiment of the control system.

With reference to FIG. 2, each cylinder of the engine 44 preferably has a fuel injector 74 to inject fuel for combustion with air in an associated combustion chamber. The fuel is supplied from the fuel tank 52. A fuel pressurization system is provided to pressurize the fuel. The fuel pressurization system preferably includes a pressure regulator to keep the fuel pressure substantially constant.

A control device is provided to control an amount of the fuel that is injected in accordance with an amount of air that is supplied to the combustion chamber to keep a desired air/fuel ratio. In the illustrated embodiment, an electronic control unit (ECU) 76 is employed as the control device. The ECU 76 controls injection timing and duration of each injection to measure the fuel amount because the fuel pressure is regulated to be substantially constant. The ECU 76 preferably electrically drives the fuel injectors 74 through an injector driver 78.

The engine 44 preferably has an ignition system to ignite the air/fuel charges in the combustion chambers. The ignition system includes spark plugs allotted to the respective combustion chambers. The spark plugs are activated through ignition coils 80 at ignition timing under control of the ECU 76. The air/fuel charges are burned within the combustion chambers to output power through the crankshaft. The ECU 76 preferably drives the ignition coils 80 through an ignition coil driver 82.

Also, the engine 44 preferably has a starter motor 86 that starts engine operation. More specifically, the starter motor 86 preferably has a one-way clutch mechanism that is coupled with the crankshaft. When the starter motor 86 is activated, the starter motor 86 correctly rotates the crankshaft through the one-way clutch mechanism. Once the engine 44 is started and crankshaft rotates by itself, the clutch mechanism decouples the engine 44 from the starter motor 86 so as not to back drive the starter motor 86.

The starter motor 86 has a starter relay unit 88. The starter motor 86 is connected to a battery unit 89 through the starter relay unit 88. For example, the battery unit 89 supplies electric power of twelve volts. The electric power is connected to the starter motor 86 through the starter relay unit 88. The control system 32 deactivates the starter relay unit 88 if a start inhibiting command is provided as described in greater detail below.

With continued reference to FIG. 2, a preferred embodiment of the control system 32 is described.

The rider of the watercraft 30 can control the engine 44 through the control system 32. In the illustrated embodiment, the rider can select a start allowing mode (i.e., a start mode) or a start-inhibiting mode (i.e. a lock out mode). The engine 44 can be started by operating the start switch in the start-allowing mode. On the other hand, the engine cannot be started in the start-inhibiting mode even though the start switch is operated. This is useful as a theft protection or immobilizing system. That is, if the rider sets the control system into the start-inhibiting mode when he leaves the watercraft 30, no one else cannot start the engine so as to inhibit the watercraft 30 from being stolen.

In the illustrated embodiment, the rider can also select a normal operation mode or a slow speed operation mode using the control system 32. The engine 44 can be operated at any engine speed in the normal operation mode. On the other hand, the maximum output of the engine can be limited to less than a preset speed in the low speed operation mode. This is also useful as a theft protection because the watercraft can only travel at relative low speeds, which makes it easier to catch a stolen watercraft.

The control system 32 preferably comprises a command unit 90, the ECU 76, a system relay unit 92 and a crankshaft angle position sensor 96. The command unit 90 in turn comprises a transmitter 98 and a receiver 100 in this embodiment. The battery unit 89 supplies electric power to the ECU 76 and to the receiver 100 through the system relay unit 92. The crankshaft angle position sensor 96 senses an angular position of the crankshaft and sends a crankshaft angle position signal to the ECU 76.

The receiver 100 and the ECU 76 preferably are disposed in the engine compartment. In the illustrated embodiment, the receiver 100 and the ECU 76 are housed in separate casings positioned close to each other. In one variation, the receiver 100 and the ECU 76 can be housed together in a single casing. The rider carries the transmitter 98 and preferably sends a command signal to the receiver 100 in the form of radio frequencies; however, other signal forms (e.g., infrared or electrical signals over a hard wire connection) can also be used. The receiver 100 and the ECU 76 are connected to each other preferably by a communication device 102 such as, for example, at least one wire or a photo coupling. The receiver 100 transfers the command signal to the ECU 76 through the communication device 102.

The transmitter 98 preferably has an unlock button 104 and a lock button 106. In the illustrated embodiment, the transmitter 98 creates a command signal C1 including start allowing mode information and normal operation mode information when the rider pushes the unlock button 104 for a period of time shorter than a preset time period. The preset time period can be, for example, two seconds. The transmitter 98 creates a command signal C2 including start allowing mode information and slow speed operation mode information when the rider pushes the unlock button 104 for a period of time longer than the preset time period. If the rider pushes the unlock button 104 again for the period of time longer than the preset time, then the transmitter 98 creates the command signal C1. Thus, the transmitter 98 alternately creates either the command signal C1 or C2 whenever the rider pushes the unlock button 104 for such a longer period. On the other hand, the transmitter 98 creates a command signal C3 including start inhibiting mode information when the rider pushes the lock button 106.

The command signals C1, C2 and C3 preferably have a frame structure that includes a data field. The foregoing pieces of information can be carried on the data field. The frame of the command signals C1, C2 and C3 comprises a plurality of bits. The transmitter 98 sends one of the command signal C1, C2 or C3 to the receiver 100 in response to the rider pushing one of the buttons 104, 106.

In one variation, the transmitter 98 can have an operation mode selector separately from the lock and unlock buttons 104, 106 to select the normal operation mode or the slow speed operation mode. For example, a slide switch can be applied. When the slide switch is placed on one side, the transmitter 98 can send the command signal C1 with the unlock button 104 being pushed. On the other hand, when the slide switch is placed on another side, the transmitter 98 can send the command signal C2 with the unlock button 104 being pushed.

In another variation, the transmitter can have only the operation mode to simply set the engine either to be started or to be not started. In this alternative, the receiver and the transmitter can have a common ID number. If the transmitter sends a command signal including an ID number that is consistent with an ID number stored in the receiver, then the transmitter accepts the command signal to allow the engine to be started.

The receiver 100 preferably comprises an antenna 110, a power circuit 112, a system relay drive circuit 114, a starter relay drive circuit 116, a central processing unit (CPU) 118, a non-volatile memory 120, an input interface 122 and an output interface 124.

The antenna 110 preferably is connected to the CPU 118 via the input interface 122. The antenna 110 picks up the command signal C1, C2 or C3, which is selectively sent from the transmitter 98, and transfers the command signal C1, C2 or C3 to the CPU 118 through the input interface 122.

The power circuit 112 supplies the electric power of the battery unit 89 to the CPU 118 through the system relay unit 92. Preferably, the power circuit 112 lowers the voltage of the battery unit 89 to an appropriate voltage for the CPU 118 such as, for example, five volts. The system relay drive circuit 114 preferably is interposed between the system relay unit 92 and the CPU 118. The CPU 118 activates the system relay unit 92 when the CPU 118 receives the command signal from the antenna 110. The system relay unit 92 is set to a position in which the electric power of the battery unit 89 is supplied to the electric circuit 112 when activated and holds the position by itself until the stop switch is operated by the rider. The receiver 100 can include an on-board power storage device that initially powers the CPU 118 and system relay drive circuit 114 at least until the system relay unit 92 is activated, or an auxiliary power supply can be used for this purpose.

The CPU 118 can activate the starter relay drive circuit 116 only when the CPU 118 receives the command signal C1 or C2 that includes the start allowing mode information. In other words, the CPU 118 deactivates the starter relay drive circuit 116 when the CPU 118 receives the command signal C3 that includes the start inhibiting mode information. The starter relay unit 88 is ready to be set to a position in which electric power from the battery unit 89 is supplied to the starter motor 86 when the starter relay drive circuit 116 is activated. However, unless the start switch is operated, the starter relay unit 88 is not actually set to the position. When the starter switch is operated under this condition, the starter motor 86 rotates the crankshaft to start the engine 44. On the other hand, the starter relay unit 88 cannot be set to the position while the starter relay drive circuit 116 is deactivated.

The CPU 118 preferably incorporates memory at least some of which is volatile. In the illustrated embodiment, the memory includes at least one ROM and one RAM 126. The ROM preferably stores a control program run on the CPU 118. The illustrated RAM 126 has several memory pieces. The command signal C1, C2 or C3 is temporarily stored in the RAM 126 and then is transferred to the ECU 76 through the communication device 102. Additionally, in the illustrated embodiment, the command signal C1, C2 or C3 is stored in the non-volatile storage 120 at the initial moment or replaces the command signal C1, C2 or C3 previously stored if the newly transmitted command signal C1, C2 or C3 is different from the previously transmitted command signal C1, C2 or C3. The non-volatile storage 120 stores the command signal C1, C2 or C3 as a backup in case an error occurs such as, for example, power failure. The non-volatile storage 120 preferably is formed with an EPROM, for example, and can maintain data (e.g. information) until even though the electric power is shut down.

The CPU 118 can read the command signal C1, C2 or C3 from the non-volatile storage 120 whenever the command signal C1, C2 or C3 stored in the non-volatile storage 120 is necessary. For instance, the stored command signal C1, C2 or C3 should be read, for example, when a power failure occurs. In the illustrated embodiment, the CPU 118 verifies whether the command signal C1, C2 or C3 can be correctly read from the non-volatile memory 120.

In the verification process, the illustrated CPU 118 triplicates the command signal C1, C2 or C3 when the CPU 118 reads out the command signal C1, C2 or C3 from the non-volatile storage 120 and then stores the triplicated signal C1, C2 or C3 in the RAM 126. For instance, if the command signal is C1, which is read out, three copies C1a, C1b and C1c are made as a test set and stored in the RAM 126. The CPU 118 compares the triplicated command signal C1a, C1b, C1c to one another. If all the signals C1a, C1b and C1c are identical, the CPU 118 determines that it has correctly read the command signal C1. If two of the signals C1a, C1b, C1c are identical and one is different, the CPU 118 uses the command signal corresponding to the identical two signals. If all the signals C1a, C1b, C1c are different from each other, the CPU 118 compares again the triplicated command signals C1a, C1b, C1c with one another. If the CPU 118 fails twice or several times, the CPU 118 can send an error message signal to the ECU 76 and can wait for a new command signal C1, C2 or C3 to be sent from the transmitter 98.

With continued reference to FIG. 2, the ECU 76 preferably comprises a power circuit 130, a system relay drive circuit 132, a CPU 134, a non-volatile storage 136 and input interfaces 138, 140 in addition to the injector driver 78 and the ignition coil driver 82. The CPU 134 preferably incorporates at least one ROM and one RAM 144. The power circuit 130, the system relay drive circuit 132, the CPU 134 and the non-volatile storage 136 are similar to the power circuit 112, the system relay drive circuit 114, the CPU 118 and the non-volatile storage 120 of the receiver 100, respectively. The ROM and RAM 144 also are similar to the ROM and the RAM 126 of the receiver 100, respectively. The ROM stores at least one control program, which will be described below with reference to FIGS. 3 and 4.

The power circuit 130 supplies electric power to the CPU 134 through the system relay unit 92 when the system relay unit 92 is activated by the system relay drive circuit 114. The system relay drive circuit 132 together with the system relay drive circuit 114 holds the system relay unit 92. The system relay unit 92 can hold itself in the activated state until the stop switch is operated or a preset period of time elapses. That is, the system relay unit 92 preferably is deactivated when a preset period of time elapses after the engine stop switch was operated or when a preset period of time elapses after the system relay unit 92 was activated unless the engine 44 is started. For Example, the preset time can be 30 seconds. Preferably, the CPU 134 counts its clock pulses to measure the preset time and deactivate the system relay unit 92 through the system relay drive circuit 132.

The CPU 134 receives the command signal C1, C2 or C3 through the input interface 138. The command signal C1, C2 or C3 is temporarily stored in the RAM 144. The command signal C1, C2 or C3 also is stored in the non-volatile storage 136 at the initial moment or replaces the command signal C1, C2 or C3 previously stored if the new command signal C1, C2 or C3 is different from the previous command signal C1, C2 or C3. Like the non-volatile storage 120, the non-volatile storage 118 stores the command signal C1, C2 or C3 as backup data in case of an error. The error can include failure in communication between the receiver 100 and the ECU 76 through the communication device 102 as well as a power failure.

The CPU 134 controls the fuel injectors 74 and the ignition coils 80 through the injector driver 78 and the ignition coil driver 82, respectively, based in part on the command signals C1, C2 or C3 transferred from the receiver 100. In the illustrated embodiment, the CPU 134 determines whether the command signal C1, C2 or C3 is correctly transferred from the receiver 100 before controlling the fuel injectors 74 and the ignition coils 80. In order to determine whether the command signal C1, C2 or C3 is correctly transferred, the CPU 134 preferably determines whether the command signal C1, C2 or C3 has a preset frame structure, which need not include addressing information. That is, the CPU 134 determines whether the bits of the frame of the command signal C1, C2 or C3 has the normal number and/or determines whether a start bit and/or end bit regularly appears. Other determination manners can be practiced using data of the command signal. If at least one of those determinations is negative, the CPU 134 determines that the command signal C1, C2 or C3 is incorrectly transferred. Under this condition, the CPU 134 in the illustrated embodiment uses a command signal C1, C2 or C3 that has been previously stored in the non-volatile storage 136.

Before employing the command signal C1, C2 or C3 stored in the non-volatile storage 136, the CPU 134 determines whether the command signal C1, C2 or C3 has been correctly read out of memory. The determination can be made in a manner similar to the manner that the CPU 118 conducts when verifying whether the command signal C1, C2, C3 is correctly read out from the non-volatile storage 120. That is, the CPU 134 triplicates the command signal C1, C2 or C3 and then stores the triplicated signal C1, C2 or C3 in the RAM 144. If, for instance, the read command signal is C1, three copies C1a, C1b, C1c are made as a test set and stored in the RAM 144. The CPU 134 compares the command signals C1a, C1b, C1c to one another. If all the signals C1a, C1b, C1c are identical, the CPU 134 determines that it has correctly read the command signal C1. If two of the signals C1a, C1b, C1c are identical and one is different, the CPU 134 employs the command signal corresponding to the identical two signals. If all the signals C1a, C1b, C1c are different from each other, the CPU 134 compares again the triplicated command signals C1a, C1b, C1c with one another.

If the CPU 134 fails twice or several times, the CPU 134 abandons use of the command signal C1, C2 or C3 stored in the non-volatile storage 136 and controls the fuel injectors 74 and the ignition coils 80 in complying with a predetermined command signal PC. The control program preferably has the predetermined command signal PC as data therein. The predetermined command signal preferably is the same as the command signal C2 that includes the start allowing mode information and the slow speed operation mode information. In one variation, the ROM can store the predetermined command signal PC and the CPU 134 can read out the stored PC in complying with a modified control program.

The CPU 134 receives a crankshaft angle position signal from the crankshaft angle position sensor 96 through the input interface 140. The CPU 134 calculates engine speed using the crankshaft angle position signal versus time. In this regard, the crankshaft angle position sensor 96 and the CPU 134 form an engine speed detector. In one variation, a camshaft angle position sensor can replace the crankshaft angle position sensor 96. Additionally, other types of sensors can be used to detect the speed of the engine or of the watercraft (e.g., an impeller shaft angle position sensor). Preferably, using the engine speed, the CPU 134 determines whether the crankshaft of the engine 44 is standstill or is rotating. The CPU 134 preferably makes the determination by watching whether the engine speed becomes greater than a preset threshold or whether the engine speed becomes less than the preset threshold. In the illustrated embodiment, the CPU 134 employs a preset threshold that has a hysteresis. That is, for example, the CPU 134 determines that the crankshaft is rotating when the engine speed exceeds 150 rpm. The CPU 134 also determines that the crankshaft is not rotating when the engine speed falls less than 50 rpm. Because the starter motor 86 preferably rotates the crankshaft at approximately 300 rpm, the CPU 134 can determine that the engine 44 is cranking or not by watching the engine speed. These relative engine speeds are of course by way of just one example.

Other sensors or detectors can be connected to the CPU 134 through input interfaces as well. For example, a throttle valve opening sensor can be connected to the CPU 134 to send a signal indicative of an angular position of a throttle valve of the engine 44.

The communication device 102 preferably is interactive. The CPU 134 of the ECU 76 commands the CPU 118 of the receiver 100 at regular intervals such as, for example, five or six milli-seconds to transfer the command signal C1, C2 or C3. In response, the CPU 118 transfers the command signal C1, C2 or C3 temporarily stored in the RAM 126. In the event the RAM 126 loses the command signal C1, C2 or C3 due to a power failure, for example, the CPU 118 transfers the command signal C1, C2 or C3 read out from the non-volatile storage 120. If the foregoing verification is failed, the CPU 118 sends the error message signal to the CPU 134. The CPU 134 controls the fuel injectors 74 and the ignition coils 80 using the command signal C1, C2 or C3 transferred from the CPU 118. If the CPU 134 determines that the command signal C1, C2 or C3 is not correctly transferred or receives the error message signal, the CPU 134 tries to use the command signal C1, C2 or C3 read out from the non-volatile storage 136. If the CPU 134 determines that the command signal C1, C2 or C3 is not correctly read out from the non-volatile storage 136, the CPU 134 then employs the predetermined command PC in the control program.

Through the communication device 102, the ECU 76 can inform the receiver 100 that the engine 44 has already been started. The information stops the receiver 100 from erroneously sending command signal C2 or C3. This is advantageous because the engine 44 will not unintentionally stop or move to the slow speed operation mode. In one variation, the ECU 76 can reject the command signal C2 once the engine is running by means of a control program irrespective of receiving the command signal C2.

Figure 3:
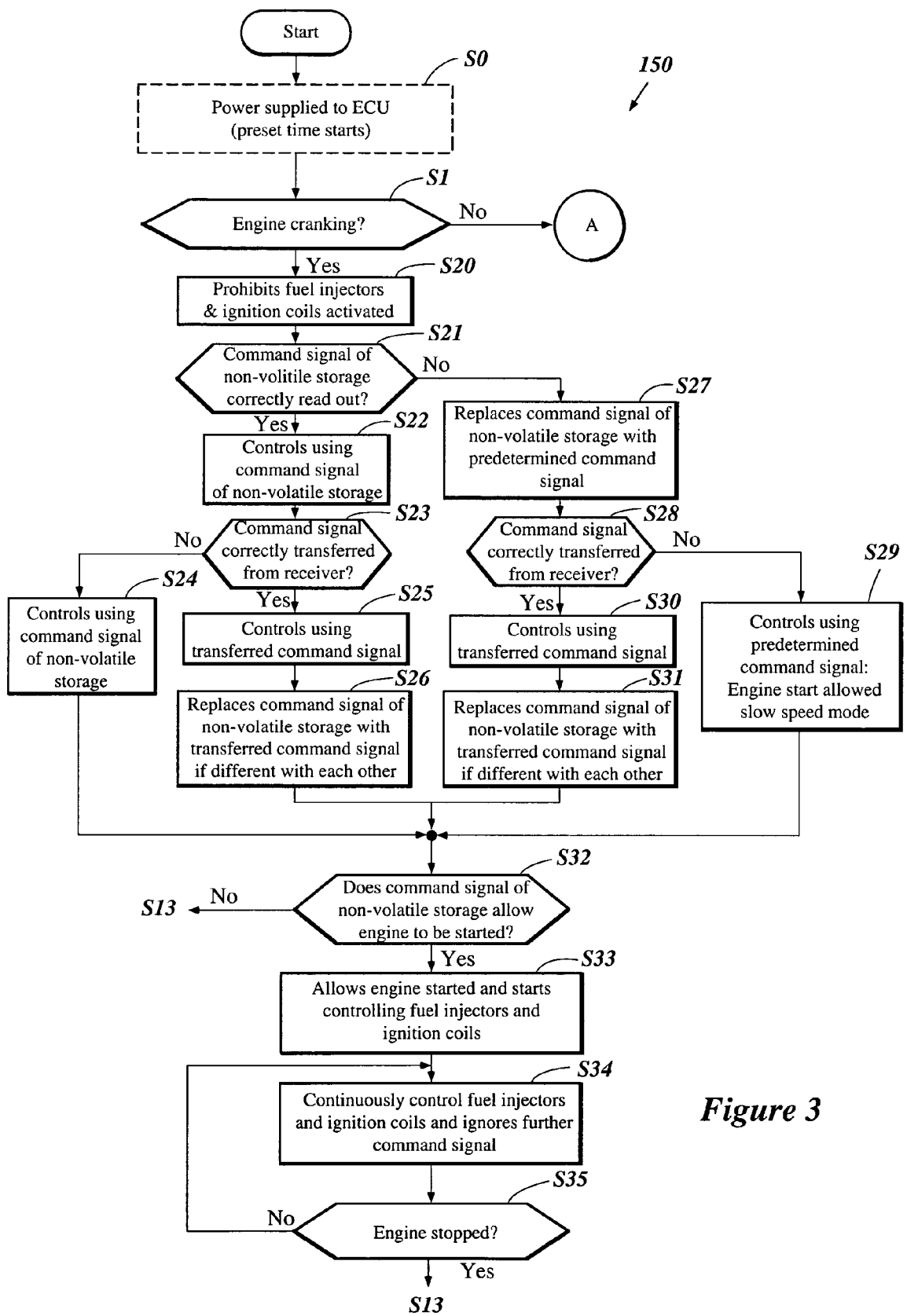
FIG. 3 illustrates a first portion of a flow chart of an embodiment of the operation of the control system of FIG. 2.
Figure 4:
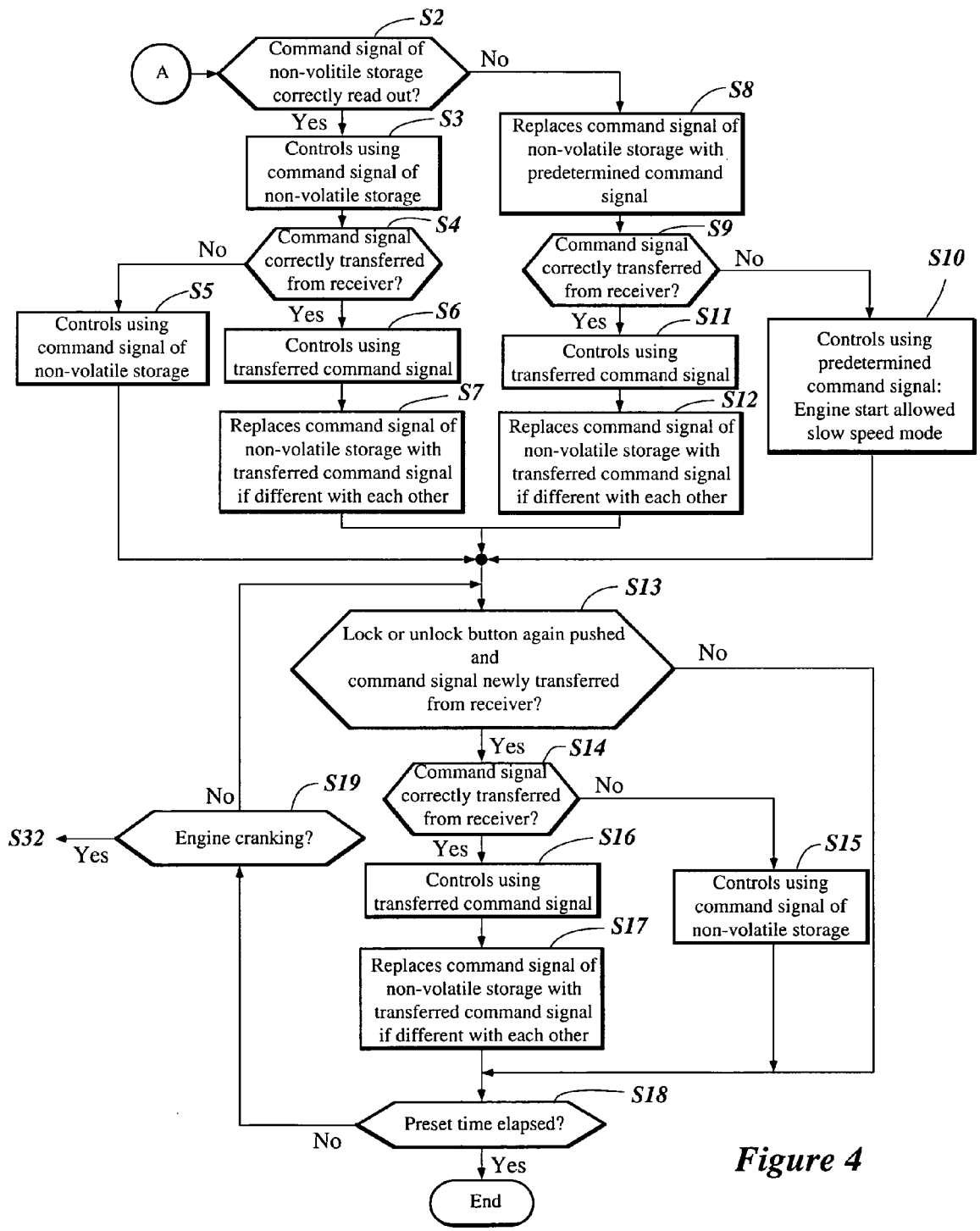
FIG. 4 illustrates a second portion of the flow chart branched off from the first portion of the flow chart of FIG. 3.

With reference to FIGS. 3 and 4, a preferred control program 150 is described below. The control program 150 preferably is stored in the ROM of the CPU 134. The control program 150 primarily determines whether a command signal is correctly transferred from the receiver 100 to the ECU 76 and also determines whether a command signal is correctly read out from the non-volatile storage 136. The control program 150 uses a command signal read out from the non-volatile storage 136 if determined that the command signal is incorrectly transferred. The control program 150 also uses a predetermined command signal if determined that the command signal is incorrectly read out from non-volatile storage 136.

Initially, the rider pushes the unlock button 104 or the lock button 106 on the transmitter 98 to send one of the command signal C1, C2 or C3 to the receiver 100. Before the program 150 actually starts, upon receiving a command signal C1, C2 or C2 from the transmitter 98, the CPU 118 of the receiver 100 starts controlling the system relay drive circuit 114 to activate the power circuits 112, 130 through the system relay unit 92 as indicated in the operation block S0 of FIG. 3 in complying with its own control program. The ECU 76 including the CPU 134 then is activated. Simultaneously, the CPU 134 starts counting elapsed time using its internal clock.

At step S1 of FIG. 3, the CPU 134 determines whether the engine 44 is cranking. In other words, the CPU 134 determines whether the engine speed exceeds the preset threshold (e.g., 150 rpm) based upon the signal sent from the crankshaft position sensor 96. When the cranking signal is provided, the illustrated ECU 76 is ready to start controlling the fuel injectors 74 and the ignition coils 80. If the determination is negative, the program 150 goes to step S2 of FIG. 4.

The CPU 134, at step S2, reads out a command signal C1, C2 or C3 previously stored in the non-volatile storage 136 and determines whether the command signal C1, C2 or C3 is correctly read out from the non-volatile storage 136 using the verification process described above. That is, the CPU 134 creates three copies of the command signal C1, C2 or C3 and compares the signal to one another. If the determination is positive, the program 150 goes to step S3.

At step S3, the program 150 allows the CPU 134 to use the command signal C1, C2 or C3 read out from the non-volatile storage 136 in case the command signal C1, C2 or C3 transferred from the receiver 100 cannot be used. The program 150 then goes to step S4.

The CPU 134 determines, at step S4, whether the command signal C1, C2 or C3 is correctly transferred from the receiver 100. The determination is made in accordance with the verification process described above. That is, the CPU 134 verifies that one or more of the bits of the frame of the command signal C1, C2 or C3 have the normal number and/or verifies if a start bit and/or end bit regularly appears. If the determination is negative, the command signal C1, C2 or C3 is not correctly transferred from the receiver 100. The program 150 goes to step S5.

At step S5, the CPU 134 uses the command signal C1, C2 or C3 that it read out from the non-volatile storage 136. The program 150 then goes to step S13.

If the determination at step S4 is positive, the program 150 goes to step S6. At step S6, the CPU 134 uses the command signal C1, C2 or C3 received from the receiver 100. The program goes to step S7, afterwards.

At step S7, the CPU 134 compares the command signal C1, C2 or C3 transferred from the receiver 100 with the command signal C1, C2 or C3 read out from the non-volatile storage 136. If the signals are different from each other, the CPU 134 replaces the command signal C1, C2 or C3 stored in the non-volatile storage 136 with the command signal C1, C2 or C3 transferred from the receiver 100. The program 150 then goes to step S13.

On the other hand, if determination at step S2 is negative, the CPU 134 cannot correctly read out the command signal C1, C2 or C3 from the non-volatile storage 136. The program 150 goes to step S8.

At step S8, the CPU 134 replaces the command signal C1, C2 or C3 stored in the non-volatile storage 136 with the predetermined command signal PC including start allowing mode information and slow speed operation mode information. As discussed above, the predetermined command signal PC preferably is substantially the same as the command signal C2. The program 150 goes to step S9.

The CPU 134 determines, at step S9, whether the command signal C1, C2 or C3 is correctly transferred from the receiver 100. The determination is made in the verification manner described above. That is, the CPU 134 verifies if one or more of the bits of the frame of the command signal C1, C2 or C3 have the normal number and/or verifies if a start bit and/or an end bit regularly appears. If the determination is negative, the command signal C1, C2 or C3 is not correctly transferred from the receiver 100. The program 150 goes to step S10.

At step S10, the program 150 has the CPU 134 use the predetermined command signal PC read out from the non-volatile storage 136. The program 150 then goes to step S13.

If the determination at step S9 is positive, the program 150 goes to step S11. The program 150, at step S11, has the CPU 134 use the command signal C1, C2 or C3 transferred from the receiver 100. The program goes to step S12.

At step S12, the CPU 134 compares the command signal C1, C2 or C3 transferred from the receiver 100 with the predetermined command signal PC read out from the non-volatile storage 136. If the transferred command signal is the signal C1 or C3, the signal is different from the predetermined command signal PC, the CPU 134 replaces the predetermined command signal PC in the non-volatile storage 136 with the command signal C1 or C3 transferred from the receiver 100. If the transferred command signal is the signal C2, this signal preferably is substantially the same as the predetermined command signal PC, the CPU 134 may not need to replace the predetermined command signal PC in the non-volatile storage 136 with the command signal C2 transferred from the receiver 100. The program 150 then goes to step S13.

The CPU 134, at step S13, determines whether the lock button or the unlock button of the transmitter 98 is again pushed to generate the command signal C1, C2 or C3 and whether the command signal C1, C2 or C3 is newly transferred to the ECU 76 from the receiver 100. If the determination is negative, the program 150 goes to step S18. If the determination is positive, the program 150 goes to step S14.

The CPU 134 determines, at step S14, whether the command signal C1, C2 or C3 is correctly transferred from the receiver 100. The determination is made in the verification manner described above. That is, the CPU 134 verifies if one or more of the bits of the frame of the command signal C1, C2 or C3 have the normal number and/or verifies if a start bit and/or an end bit regularly appears. If the determination is negative, the command signal C1, C2 or C3 is not correctly transferred from the receiver 100. The program 150 goes to step S15.

At step S15, the program 150 has the CPU 134 use the command signal C1, C2 or C3 read out from the non-volatile storage 136. If the predetermined command signal PC has replaced the command signal C1, C2 or C3 at step S8 and the CPU 134 still uses the predetermined command signal PC at step S10, the command signal stored in the non-volatile storage 136 is the predetermined command signal PC (which preferably equals C2). The program 150 then goes to step S18.

If the determination at step S14 is positive, the program 150 goes to step S16. The program 150, at step S16, has the CPU 134 use the command signal C1, C2 or C3 transferred from the receiver 100. The program then goes to step S17.

At step S17, the CPU 134 compares the command signal C1, C2 or C3 transferred from the receiver 100 with the command signal C1, C2 or C3 read out from the non-volatile storage 136. If the signals are different from each other, the CPU 134 replaces the command signal C1, C2 or C3 stored in the non-volatile storage 136 with the command signal C1, C2 or C3 transferred from the receiver 100. If the predetermined command signal PC has replaced the command signal C1, C2 or C3 at step S8 and the CPU 134 still uses the predetermined command signal PC at step S10, the command signal stored in the non-volatile storage 136 is the predetermined command signal PC. The program 150 then proceeds to step S18.

The CPU 134, at step S18, determines whether the preset time (e.g., 30 seconds) has elapsed after the system relay unit 92 was activated. If the determination is negative, the program 150 goes to step S19. If the determination is positive, the program 150 ends. The program will restart and begin again at step S0 the next time the transmitter sends a command signal C1, C2 or C3.

At step S19, the CPU 134 determines whether the engine 44 is cranking (i.e., whether the engine speed exceeds the preset threshold). If the determination is negative, the program 150 returns back to step S13. If the determination is positive, the program goes to step S32 of FIG. 3.

With reference back to FIG. 3, if the determination at step S1 is positive, the engine speed exceeds the preset threshold because the rider or someone else operates the starter switch. The program 150, however, does not immediately allow the CPU 134 to start the engine 44. The program 150 goes to step S20 and prohibits the CPU 134 from activating the fuel injectors 74 and the ignition coils 80. Under this condition, the program 150 has the CPU 134 verify if the command signal C1, C2 or C3 is correctly read out from the non-volatile storage 136 and also if the command signal C1, C2 or C3 is correctly transferred from the receiver 100. Preferably, the verification processes are the same as those conducted at steps S2–S12. The program 150 goes to step S21 and then proceeds to steps S22–S31 that follow step S21. Because steps S21–S31 exactly correspond to steps S2–S12, respectively, further descriptions of these steps is believed not to be necessary to understand the operation of the program 150. After conducting those steps S21–S31, the program 150 proceeds to step S32.

At step S32, the CPU 134 determines whether the command signal read out from the non-volatile storage 136 allows the engine 44 to be started. In other words, the CPU 134 determines whether the command signal is either C1 or C2 (or PC). If the determination is negative (i.e., the command signal is neither C1 nor C2 but rather is C3), the program 150 goes to step S13 of FIG. 4 and the CPU 134 conducts steps S13–S19. That is, the CPU 134 commands the starter relay drive circuit 116 not to allow the starter relay unit 88 to move to the activated position to engage the starter motor 86. The engine 44 cannot be started and the CPU 134 waits for a new command signal to be provided. This is also true even if the determination at step S19 is positive unless the new command signal is provided.

If the determination-at-step S32 is positive (e.g., the command signal is C1 or C2), the program 150 goes to step S33. The CPU 134, at step S33, allows the starter motor 86 to start the engine 44 through the starter relay drive circuit 116 and the starter relay unit 88. The engine 44 thus can be started. Afterwards, if the command signal is C1, the CPU 134 starts controlling the fuel injectors 74 and the ignition coils 80 such that the engine 44 operates in the normal operation mode. If, on the other hand, the command signal is C2 (or PC in the illustrated embodiment), the CPU 134 starts controlling the fuel injectors 74 and the ignition coils 80 such that the engine 44 operates in the slow speed operation mode. The program 150 then goes to step S34.

At step S34, the CPU 134 continuously controls the fuel injectors 74 and the ignition coils 80 in complying with the command signal initially provided by the transmitter 98 (e.g., in the normal operation mode or in the slow speed operation mode). Also, the CPU 134, at step S34, ignores any further command signal which can be provided through the transmitter 98 and the receiver 100 by the rider or someone else. This is because the further command signal can contradict the command signal that has been already employed. For example, if the already employed command signal is C1 and the further command signal is C3, the engine 44 could be stopped unintentionally unless such a further command signal is prohibited. The program 150 then goes to step S35.

At step S35, the CPU 134 determines whether the engine 44 is stopped. In other words, the CPU 134 determines whether the engine speed falls lower than the preset speed. In one variation, the program 150 can be modified such that the CPU 134 simply determines whether the stop switch is operated rather than watching the engine speed. If the determination is negative, the program 150 returns back to the S34. If the determination is positive, the program 150 goes to step S13. As discussed above, the system relay unit 92 can be actuated for the preset time (e.g., 30 seconds) after the engine 44 is stopped. In the illustrated embodiment, if the engine 44 is cranking during the preset time, the determination at step S19 is positive. If the determination at step S32 is positive again, the engine 44 can be restarted at step S33 without returning back to step S1.

The program 150 described above is one preferred example and can of course be modified while still achieving the control principals described herein. For example, a step similar to step S19 can be additionally placed immediately before S13.

As thus discussed, in the illustrated embodiment, the ECU primarily uses a command signal transferred from the receiver. If the command signal transferred from the receiver is incorrect, the ECU uses a command signal previously stored in the non-volatile storage of the ECU. If the command signal read out from the non-volatile storage also is incorrect, the ECU uses the predetermined command signal. The ECU thus can properly control the engine even when the transmitter and the receiver or internal modules of the control system fail to communicate properly with one another.

The predetermined command signal in the illustrated embodiment includes the start allowing mode information and the slow speed operation mode information. The ECU thus can allow the engine to be started under the condition that the command signal is not correctly transferred from the receiver or is not correctly read out from the non-volatile storage. This feature is particularly advantageous for such marine engines. In addition, the engine speed is limited to less than the preset slow speed. This feature also is useful because the engine speed cannot be higher than a speed that is not expected by the rider. This feature is particularly useful when the associated watercraft runs in an area of a harbor or marina. In addition, even if an unlawful person (e.g., thief) tries to use the watercraft and the engine starts by the predetermined command signal, the watercraft cannot proceed at a speed beyond the preset slow speed. Pursuit thus is easy and the theft can be prevented.

Although this invention has been disclosed in the context of a certain preferred embodiment, it will be understood by those skilled in the art that the present invention extends beyond the specifically disclosed embodiment to other alternative embodiments and/or uses of the invention and obvious modifications and equivalents thereof. In particular, while the present system has been described in the context of a particularly preferred embodiment, the skilled artisan will appreciate, in view of the present disclosure, that certain advantages, features and aspects of the system may be realized in a variety of other applications, many of which have been noted above. For example, the slow speed of the predetermined command signal can be either the engine speed or a speed of an associated watercraft. The system can be constructed to directly start the engine without having the start switch being operated. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiment described above, but should be determined only by a fair reading of the claims that follow.

What is claimed is:

1. A control system for a marine engine comprising a control device configured to control the engine, and a command unit configured to provide a command signal to the control device, the command unit comprising a transmitter and a receiver, the transmitter configured to create the command signal and to send the command signal to the receiver, the receiver configured to receive the command signal and to transfer the command signal to the control device, the control device including memory configured to store the command signal, the control device configured to determine whether the command signal has been correctly transferred to the control device, the control device controlling operation of the engine while the engine is running in complying with the command signal transferred from the receiver when the command signal is correctly transferred, the control device controlling operation of the engine while the engine is running in complying with the command signal stored in the memory when the command signal is not correctly transferred.

2. The control system as set forth in claim 1, wherein the control device verifies whether the command signal has a preset frame structure to determine whether the command signal is correctly transferred to the control device.

3. The control system as set forth in claim 1, wherein the command signal includes first information to instruct the control device to allow or not allow the engine to be started for operation and second information to instruct the control device to control the engine in a normal mode or in a slow speed mode.

4. The control system as set forth in claim 1, wherein the control device is configured to determine whether the command signal stored in the memory is correctly read out from the memory, the control device controlling the engine in complying with the command signal stored in the memory when the command signal is not correctly transferred and the command signal is correctly read out from memory, the control device controlling the engine in complying with a predetermined command signal when the command signal is not correctly transferred and the command signal is not correctly read out from the memory.

5. The control system as set forth in claim 4, wherein in the control device a set of the command signal is read out from memory, the set of the command signal includes multiple copies of the command signal, and the control device compares the copies of the command signals to one another to determine whether the command signal is correctly read out from memory.

6. The control system as set forth in claim 4, wherein the command signal includes first information that instructs the control device to allow or not allow the engine to be started for operation and second information that instructs the control device to control the engine in a normal mode or in a slow speed mode, and the predetermined command signal includes the first information that instructs the control device to allow the engine to be started and the second information that instructs the control device to control the engine in the slow speed mode.

7. The control system as set forth in claim 1, wherein the transmitter sends the command signal to the receiver at a radio frequency.

8. The control system as set forth in claim 1, wherein the memory is a non-volatile storage.

9. A control system for a marine engine comprising a control device configured to control the engine, and a command unit configured to provide a command signal to the control device, the command unit comprising a transmitter and a receiver, the transmitter configured to create the command signal and to send the command signal to the receiver, the receiver configured to receive the command signal and to transfer the command signal to the control device, the control device comprising a storage device configured to store the command signal, the control device configured to determine whether the command signal is correctly read out from the storage device, the control device controlling operation of the engine when the engine is running in complying with the command signal stored in the storage device when the command signal is correctly read out from the storage device, the control device controlling operation of the engine while the engine is running in complying with a predetermined command signal when the command signal is not correctly read out from the storage device.

10. The control system as set forth in claim 9, wherein in the control device a set of the command signal is read out from the storage device, the set of the command signal includes multiple copies of the command signal, and the control device compares each copy of the command signal with one another to determine whether the command signal is correctly read out from the storage device.

11. The control system as set forth in claim 9, wherein the control command includes first information that instructs the control device to allow or not allow the engine to be started for operation and second information that instructs the control device to control the engine in a normal mode or in a slow speed mode, and the predetermined command signal includes the first information that instructs the control device to allow the engine to be started and the second information that instructs the control device to control the engine in the slow speed mode.

12. The control system as set forth in claim 9, wherein the control device determines whether the command signal is correctly read out from the storage device before the engine is started for operation.

13. The control system as set forth in claim 9, wherein the control device determines whether the command signal is correctly transferred to the control device, and the control device controls the engine in complying with the command signal transferred from the receiver without using the command signal stored in the storage device when the command signal is correctly transferred.

14. A control method for controlling a marine engine comprising creating a command signal, transferring the command signal to a control device, storing the command signal in a storage device, determining whether the command signal is correctly transferred to the control device, controlling the operation of the engine while the engine is running in complying with the command signal transferred to the control device when the command signal is correctly transferred, and controlling the operation of the engine while the engine is running in complying with the command signal previously stored in the storage device when the command signal is not correctly transferred.

15. The control method as set forth in claim 14 additionally comprising verifying whether the command signal has a preset frame structure.

16. The control method as set forth in claim 14 additionally comprising reading out command signal from the storage device, determining whether the command signal is correctly read out from the storage device, controlling the engine in complying with the command signal stored in the storage device when the command signal is not correctly transferred to the control device and the command signal is correctly read out from the storage device, and controlling the engine in complying with a predetermined command signal when the command signal is not correctly transferred to the control device and the command signal is not correctly read out from the storage device.

17. The control method as set forth in claim 16, wherein determining whether the command signal is correctly read out of the storage device involves creating a set of the command signal when reading out the command signal from the storage device, the set of the command signal including multiple copies of the command signal, and comparing each copy of the command signal with one another to determine whether the command signal is correctly read out from the storage device.

18. A control method for controlling a marine engine comprising creating a command signal, transferring the command signal to a control device, storing the command signal in a storage device, reading out the command signal from the storage device, determining whether the command signal is correctly read out, controlling the operation of the engine while the engine is running in complying with the command signal stored in the storage device when the command signal is correctly read out from the storage device, and controlling the operation of the engine while the engine is running in complying with a predetermined command signal when the command signal is not correctly read out from the storage device.

19. The control method as set forth in claim 18 additionally comprising creating a set of the command signal when reading out the command signal from the storage device, the set of the command signal including multiple copies of the command signal, and comparing each copy of the command signal with one another to determine whether the command signal is correctly read out from the storage device.

20. The control method as set forth in claim 18, wherein the determination as to whether the command signal is correctly read out is made before the engine is started.

21. The control method as set forth in claim 18 additionally comprising determining whether the command signal is correctly transferred to the control device, and controlling the engine in complying with the transferred command signal without using the command signal stored in the storage device when the command signal is correctly transferred.

* * * * *

UNITED STATES PATENT AND TRADEMARK OFFICE
CERTIFICATE OF CORRECTION

PATENT NO.         : 7,130,739 B2
APPLICATION NO. : 10/858561
DATED                : October 31, 2006
INVENTOR(S)       : Ito et al.

It is certified that error appears in the above-identified patent and that said Letters Patent is hereby corrected as shown below:

In the drawings: At Sheet 3 of 4, Box S21, Figure 3, Line 2, please delete "non-volitile" and insert --non-volatile--, therefor.

In the drawings: At Sheet 4 of 4, Box S2, Figure 4, Line 2, please delete "non-volitile" and insert --non-volatile--, therefor.

At Column 10, Line 46 (approx.), after "or" please delete "C2" and insert --C3--, therefor.

At Column 13, Line 30, please delete "determination-at-step" and insert --determination at step--, therefor.

Signed and Sealed this

Seventh Day of April, 2009

JOHN DOLL
*Acting Director of the United States Patent and Trademark Office*